Nov. 3, 1970     A. M. WILSON     3,537,907

BATTERY UNIT AND HEAT SINK THEREFOR

Filed April 16, 1968

Inventor,
Arthur M. Wilson,
by James P. McAndrews
Att'y.

United States Patent Office

3,537,907
Patented Nov. 3, 1970

3,537,907
BATTERY UNIT AND HEAT SINK THEREFOR
Arthur M. Wilson, Attleboro, Mass., assignor to Texas Instruments Incorporated, Dallas, Tex., a corporation of Delaware
Filed Apr. 16, 1968, Ser. No. 721,689
Int. Cl. H01m 1/02
U.S. Cl. 136—132                    1 Claim

ABSTRACT OF THE DISCLOSURE

A rechargeable battery unit comprising a plurality of discrete battery cells electrically connected in series and enclosed in a casing is shown to incorporate a heat sink member of a selected metal having an electronically insulating surface layer thereon embodying an oxide of the metal. The heat sink member is of selected shape to conform to the configuration of the discrete battery cells for good heat-transfer therefrom and for securely locating the battery cells in spaced, electrically insulated relation to each other within the unit casing. Preferably, the heat sink has a central well for receiving temperature-sensing means.

---

Figure 1:
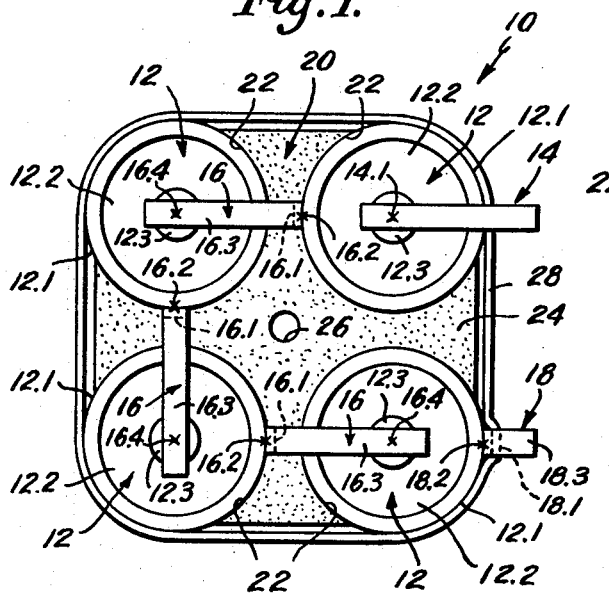

The construction of battery units made up of discrete battery cells of the standardized cylindrical configuration is troublesome in that the cylindrical walls of the battery cells are usually formed of metal and are arranged in electrical contact with the negative electrodes of the cells to serve as negative battery terminals. When series connections are made between such discrete cells in a battery unit, the walls of the discrete cells must be electrically insulated from one another. On the other hand, the battery cells in such units tend to generate substantial amounts of heat during charging of the cells. As a result, mounting the cells in electrically insulated relation to each other tends to confine generated heat within the cells during charging of the cells. This causes considerable difficulty in that, when a plurality of such cells are compactly assembled and enclosed within a casing in insulated relation to each other, charging of the cells can cause thermal runaway resulting in destruction of the cells unless charging of the cells is very closely regulated to prevent development of excessive cell temperatures. In this regard, it will be understood many charging devices for batteries incorporate temperature-sensing means which are arranged to be responsive to battery temperatures to terminate charging when these temperatures increase to undesirable levels. However, when battery units incorporating a plurality of discrete cells are charged, the cells tend to generate heat at different rates. This makes it difficult to arrange the temperature-sensing means to be responsive to the cell which is at the highest temperature in order to terminate charging of the unit before any cell of the unit is subjected to thermal destruction.

It is an object of this invention to provide a novel and improved battery unit incorporating discrete battery cells electrically connected in series; to provide such a unit in which the discrete battery cells are easily and compactly assembled with the cell container walls in electrically insulated relation to each other; to provide such a battery unit which can be charged at a relatively rapid rate with minimum risk of thermal destruction of the cells within the unit; and to provide such a battery unit in which the discrete cells are maintained at substantially equal temperatures during charging thereof for permitting convenient and accurate monitoring of cell temperatures during charging. It is also an object of this invention to provide a novel and improved heat sink member for use in mounting discrete battery cells in a battery unit and for electrically insulating the container walls of said cells from each other.

Figure 3:
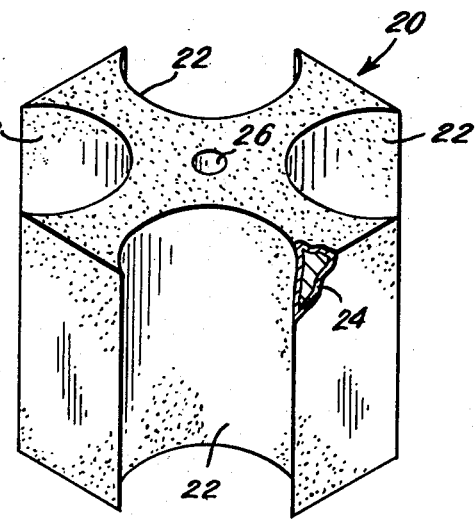
Figure 2:
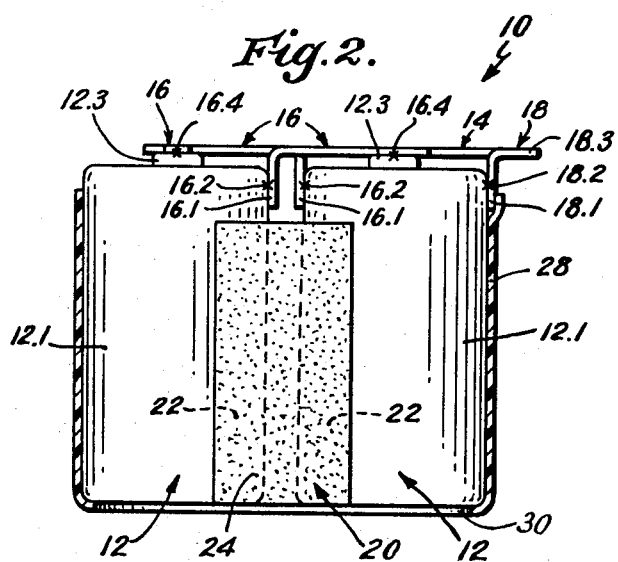
Figure 4:
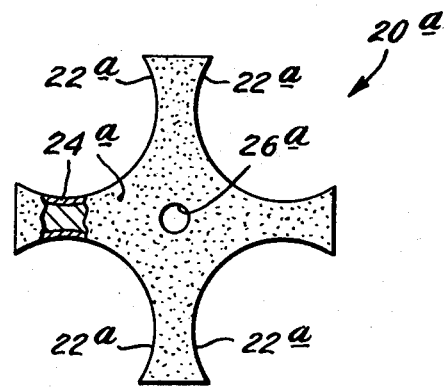

Other objects, advantages, and details of the battery unit and heat sink of this invention appear in the following detailed description of preferred embodiments of the invention, the detailed description referring to the drawings in which:

FIG. 1 is a plan view of the battery unit of this invention;
FIG. 2 is a front elevation view of the battery unit of FIG. 1 showing the unit casing in section;
FIG. 3 is a perspective view of the heat sink incorporated in the battery unit of FIG. 1; and
FIG. 4 is a plan view of an alternate embodiment of the battery unit of this invention.

Referring to the drawings, 10 in FIGS. 1 and 2 indicates the novel and improved battery unit of this invention which is shown to include a plurality of discrete battery cells 12, four of such cells being shown in the battery unit by way of example. It will be understood that the battery unit can incorporate any desired number of such cells within the scope of this invention. Each of the battery cells 12 embodies a cylindrical cup-shaped container 12.1, a cover 12.2 sealed in electrically insulated relation to the container, and a terminal cap 12.3 welded or otherwise secured in electrically conductive relation to the cell cover. As such discrete cells are well known, they are not further described herein and it will be understood that the cells embody positive and negative electrodes within the containers which are electrically connected to the cell cover and cell container respectively, so that the cover with its attached terminal cap and the container serve as positive and negative terminal means respectively for the cells. In a typical embodiment of this invention, the cells 12 comprise sealed, rechargeable nickel-cadmium batteries of standard "C" size and configuration.

In accordance with this invention, the discrete battery cells 12 are electrically connected in series relation within the battery unit 10. For example, a strip 14 of electrically conductive material such as nickel is welded as at 14.1 to the terminal cap of one off the cells 12. An additional angle-shaped strip of electrically conductive material 16 has one flange 16.1 welded or otherwise secured in electrically conductive relation to the container of the first cell as indicated at 16.2 in FIG. 1 and has its other flange 16.3 welded or secured in electrically conductive relation to the terminal cap of an adjacent cell 12 in the battery unit as indicated at 16.4. Additional angle-shaped conductive strips 16 are then welded to the container walls and terminal caps of the other cells in the battery unit for connecting the cells in series relation to each other as will be understood. An additional electrically conductive strip 18 has one flange 18.1 welded to one of the cell containers as indicated at 18.2 in FIG. 1 and has its other flange 18.3 extending laterally from the battery unit. As will be understood, the conductive strips 14 and 18 serve as the positive and negative terminals of the battery unit 10.

In accordance with this invention a heat sink member 20 is provided with a plurality of grooves 22 which conform to the cinfiguration of the battery cells 12 respectively, the cells being arranged in respective grooves in the heat sink member so that substantial surfaces of the cell container walls are in intimate engagement with the groove surfaces to provide excellent heat-transfer contact between the cells and heat sink member. The heat sink member is preferably formed of a metal of high heat conductivity characteristics and is preferably of relatively light weight. For example, in a preferred embodiment of this invention the heat sink member is formed of aluminum which is economically molded or extruded into the shape illustrated in FIGS. 1-3. The heat sink member is also provided with an insulating coating 24 as illustrated particularly in FIG. 3. For example, in a preferred embodiment of this invention, the heat sink member is formed of aluminum which is anodized in any conventional manner for providing the member with an extremely thin layer 24 of aluminum oxide. It should be understood that the heat sink member can be formed of other materials than aluminum within the scope of this invention and that the electrically insulating layer 24 can be formed upon the heat sink member in other ways. For example, the insulating layer 24 can be formed upon the heat sink member by dipping the member into a suitable electrically insulating plastic material for forming an adherent plastic coating on the member.

In a preferred embodiment of this invention, the heat sing member 20 is provided with a central recess or well 26 which is preferably or sufficient depth to extend approximately one-half way through the heat sink member.

The battery unit 10 further embodies a suitable casing 28 for holding the discrete battery cells 12 within the unit. For example, in a preferred embodiment of the invention, the casing 28 comprises a heat-shrunk sleeve of tetrafluoroethylene or the like. As will be understood, a tube of such material is easily slid over the heat sink and battery cells of the unit 10 and is heated for shrinking the tube into tight engagement with the cells for securely holding the cells and heat sink in assembled relation. Preferably, the heat-shrunk tube casing is arranged to provide a small inturned bead indicated at 30 in FIG. 2 around the bottom of the battery unit for use in resting the unit on a support without contact between the support and the bottom of the cell containers. Of course, any other suitable casing construction such as tape means wrapped around the assembled cell and heat sink member or a cup-shaped plastic container or the like can also be used within the scope of this invention.

In this construction, it can be seen that the heat sink member 20 serves to hold the discrete battery cells in assembled relation in a very compact manner to provide a battery unit of stable shape. The insulating layer, such as the anodized layer on the aluminum casing, effectively holds the discrete cells in electrically insulated relation to each other. The heat sink member is also in intimate engagement with the container walls of the cells for rapid and efficient heat-transfer from the cells to the heat sink. In this regard, it is found that the insulating layer 24 can be very thin so that the layer has substantially no significant thermal insulating effect which would tend to retard heat-transfer between the cells and the heat sink member. This is particularly true when the heat sink member is formed of aluminum having an anodized insulating layer thereon, such an insulating layer providing effective electrical insulation even when of only slightly greater than molecular thickness. In this construction, the rapid and efficient transfer of heat from the individual battery cells 12 serves to integrate the cell temperatures. That is, even though the invidivual cells may generate heat at different rates due to differences in the cells resulting from differences in manufacture, heat-transfer between the cells and the heat sink is so rapid that the cells tend to heat during charging at substantially the same rate for permitting charging of the battery units at a maximum rate. Further, this integrating effect of the heat sink member assures that the temperature of the area surrounding the well 26 substantially corresponds to the temperature of all of the individual battery cells of the unit. Thus temperature sensing means used in controlling a unit charging device can be inserted in the well with assurance that the sensing means will detect a temperature substantially corresponding to the temperature of any part of the battery unit.

It can be seen by reference to FIGS. 1-3 that the heat sink member 20 described with reference to these figures has grooves 22 which substantially enclose the cylindrical walls of the battery cells 12. Accordingly, the cells are assembled with the heat sink by sliding the cells longitudinally into the heat sink grooves. For convenience of assembly, an alternate construction of the battery unit 20a is illustrated in FIG. 4 where corresponding components are identified by related reference numerals. In this construction, it can be seen that the grooves 22a and the heat sink member are proportioned to enclose less than one-half of the cylindrical surface of the cell container walls. In this arrangement, the cells are moved laterally into the heat sink grooves in assemblying the battery unit 10a for greater convenience of manufacture.

Alternatively, the heat sink member can comprise an anodized aluminum member having one or more passages extending through the member, the passages being of suitable shape to receive battery cells therein and to conform at least groove-shaped proportions of the passages to the configuration walls of the battery cells in good heat-transfer relation to the cells.

It should be understood that although particular embodiments of the battery unit and heat sink member of this invention have been described by way of illustration, selected modifications of the invention are possible within the scope of this invention. For example a heat insulating or other regulating member of a configuration corresponding to the described heat sink member and having the described electrically insulating coating thereon could be used as a battery unit in place of the described heat sink member for use where the battery unit is to be subjected to very low temperatures. This invention includes all modifications and equivalents of the disclosed embodiments of the invention which fall within the scope of the appended claim.

I claim:

1. A rechargeable battery unit comprising a plurality of discrete, rechargeable nickel-cadmium cells each embodying positive and negative electrodes within a cylindrical metallic container, said cells each having said containers electrically connected to one of said electrodes and having containers cover means sealed to said container and electrically connected to the other of said electrodes, means connecting respective cell covers to respective cell containers for electrically connecting said cells in series relation to each other, said cells being assembled in spaced, side-by-side relation to each other, a heat sink member of aluminum having a plurality of grooves therein of configuration conforming to the cylindrical configuration of said cell containers, said heat sink member having an electrically insulating coating of aluminum oxide thereon integral with said heat sink member, said heat sink member being disposed between said cells with said grooves conforming to and in engagement with the respective cell containers for locating said containers in spaced, electrically insulated relation to each other to absorb heat from said cells, and a heat-shrunk plastic tubing surrounding and engaging said cells holding said cells in assembled relation with each other and with said heat sink member.

References Cited

UNITED STATES PATENTS

| | | |
|---|---|---|
| 1,604,872 | 10/1926 | Baird. |
| 2,740,824 | 4/1956 | Stanimirovitch __ 136—173 XR |
| 2,833,848 | 5/1958 | Marty _____ 136—111 |
| 3,219,485 | 11/1965 | Foecking et al. ____ 136—6 XR |

WINSTON A. DOUGLAS, Primary Examiner

D. L. WALTON, Assistant Examiner

U.S. Cl. X.R.

136—171